United States Patent [19]
Alveskog

[11] Patent Number: 5,948,201
[45] Date of Patent: Sep. 7, 1999

[54] METHOD AND MEANS FOR AFFIXING A DOUBLE SIDED ADHESIVE TAPE ONTO AN ELECTRIC CONDUIT AND USE THEREOF

[76] Inventor: Hans Alveskog, Fyrspannsgatan 37, S-165 64 Hässelby, Sweden

[21] Appl. No.: 08/894,459
[22] PCT Filed: Feb. 6, 1996
[86] PCT No.: PCT/SE96/00141
  § 371 Date: Aug. 4, 1997
  § 102(e) Date: Aug. 4, 1997
[87] PCT Pub. No.: WO96/24973
  PCT Pub. Date: Aug. 15, 1996

[30] Foreign Application Priority Data

Feb. 6, 1995 [SE] Sweden ................................. 9500307

[51] Int. Cl.⁶ ..................................................... B32B 31/00
[52] U.S. Cl. ........................... 156/249; 156/289; 156/577; 156/579
[58] Field of Search ..................................... 156/249, 289, 156/574, 577, 579

[56] References Cited

U.S. PATENT DOCUMENTS

| | | | |
|---|---|---|---|
| 3,829,347 | 8/1974 | Honea | 156/579 X |
| 4,067,762 | 1/1978 | Rhoads | 156/577 X |
| 4,211,598 | 7/1980 | Diegel | 156/574 X |
| 4,849,063 | 7/1989 | McXinnon | 156/579 X |
| 5,063,685 | 11/1991 | Morrison et al. | 156/574 X |
| 5,316,614 | 5/1994 | Phillips | 156/574 |
| 5,405,471 | 4/1995 | LeMaster | 156/577 X |

FOREIGN PATENT DOCUMENTS

| | | |
|---|---|---|
| 827 372 | 1/1952 | Germany . |
| 3339 143 A1 | 5/1985 | Germany . |
| 940280 | 1/1995 | Norway . |

*Primary Examiner*—Mark A. Osele
*Attorney, Agent, or Firm*—Fasth Law Offices; Rolf Fasth

[57] ABSTRACT

A method and apparatus for applying a double sided adhesive tape to a conduit for attachment of the conduit to a substrate. In the apparatus an elongate channel carrier with a plurality of differently shaped channels along its periphery is located in an elongate body. The conduit and adhesive tape travel in a passage defined by one of the channels and an interior surface of the elongate body thereby bonding the tape to the conduit. Upon exiting from the channel, the release liner is removed from the double sided adhesive tape so that the conduit can be applied to a substrate.

15 Claims, 7 Drawing Sheets

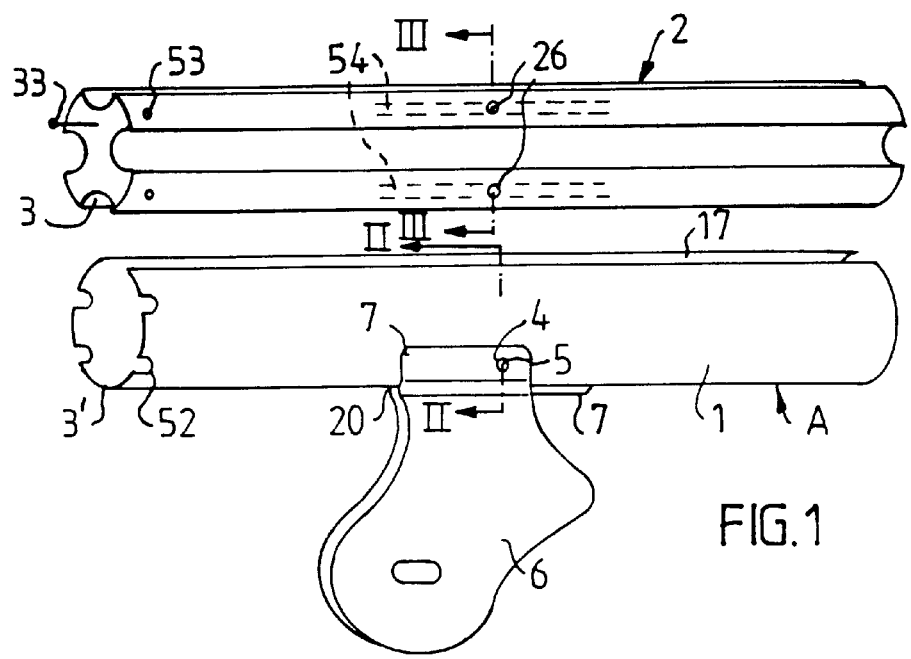
FIG. 1
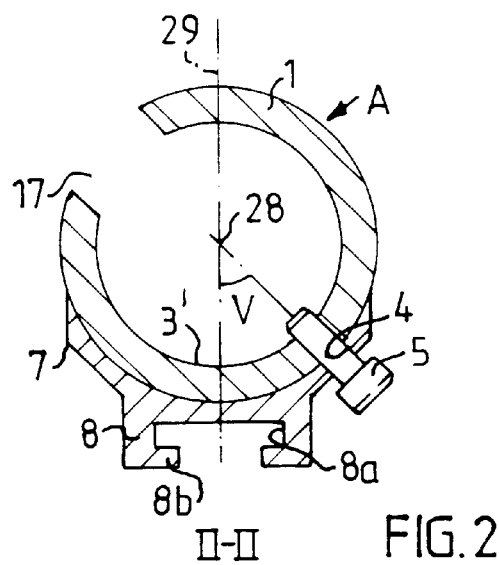
II-II  FIG. 2
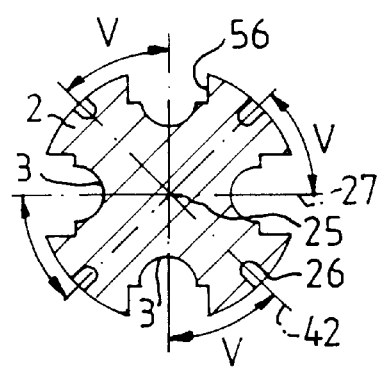
III-III  FIG. 3

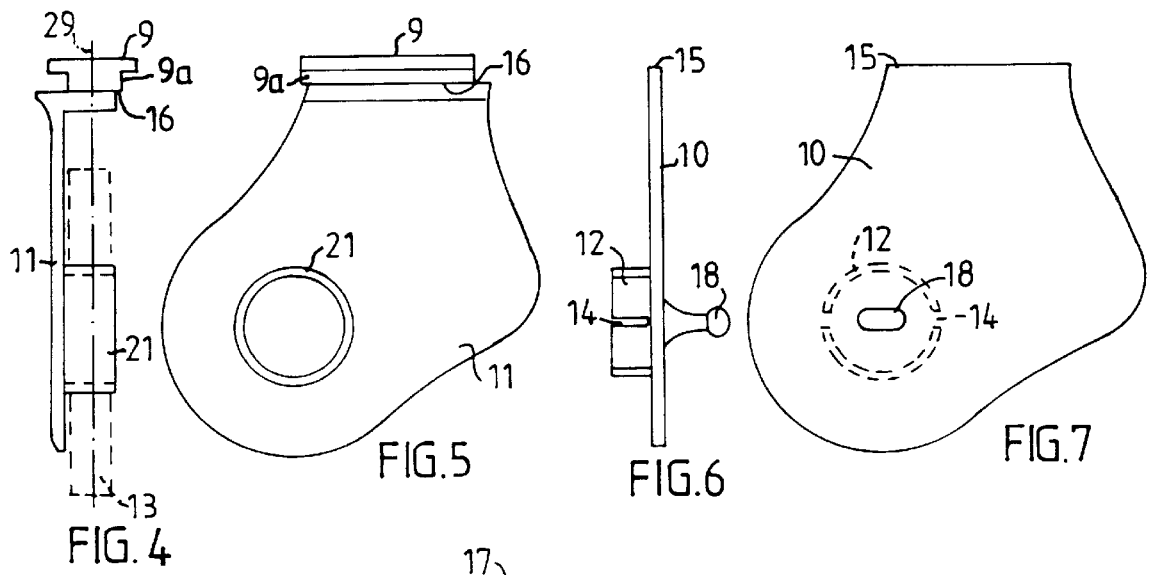
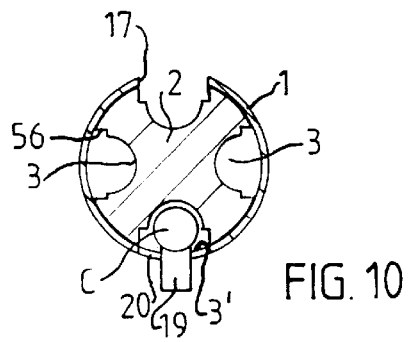
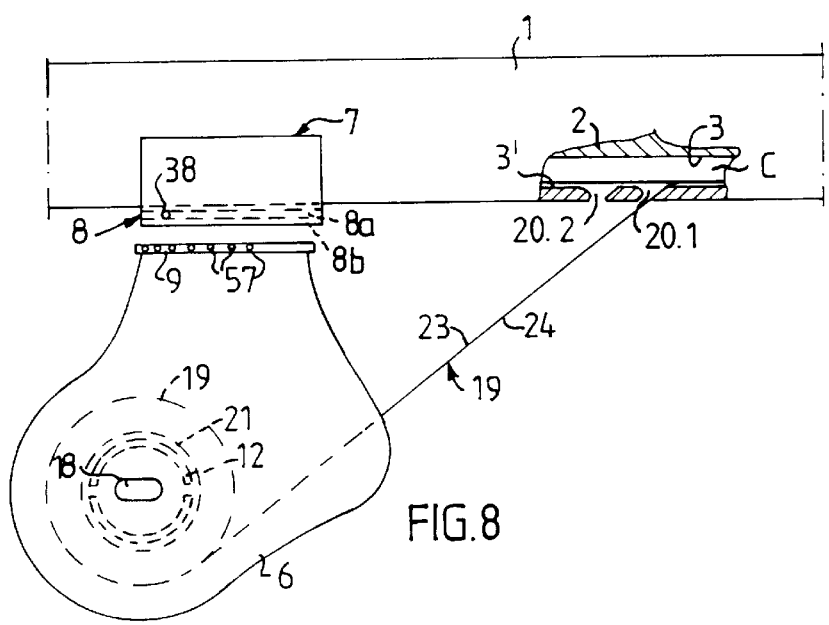

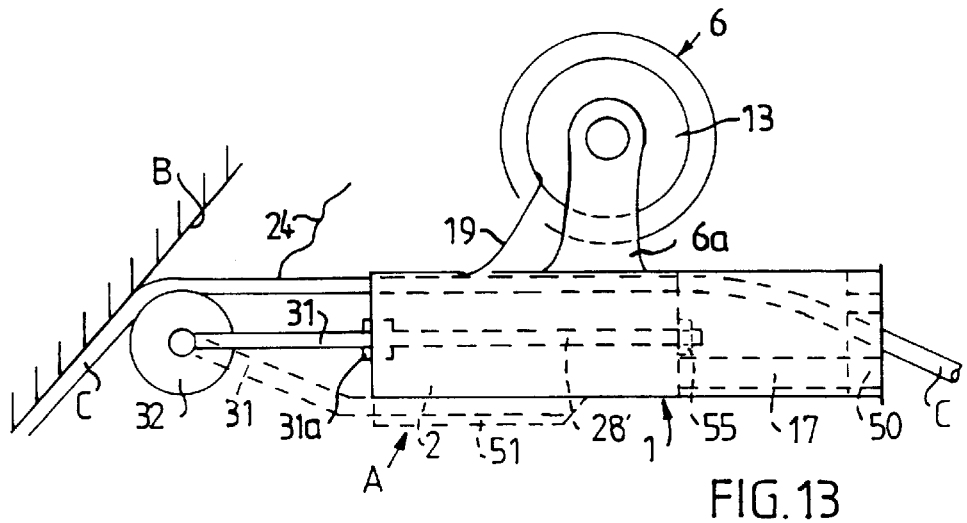
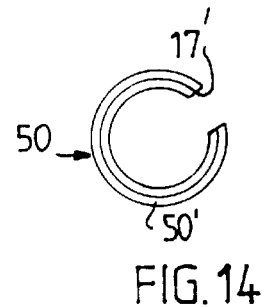
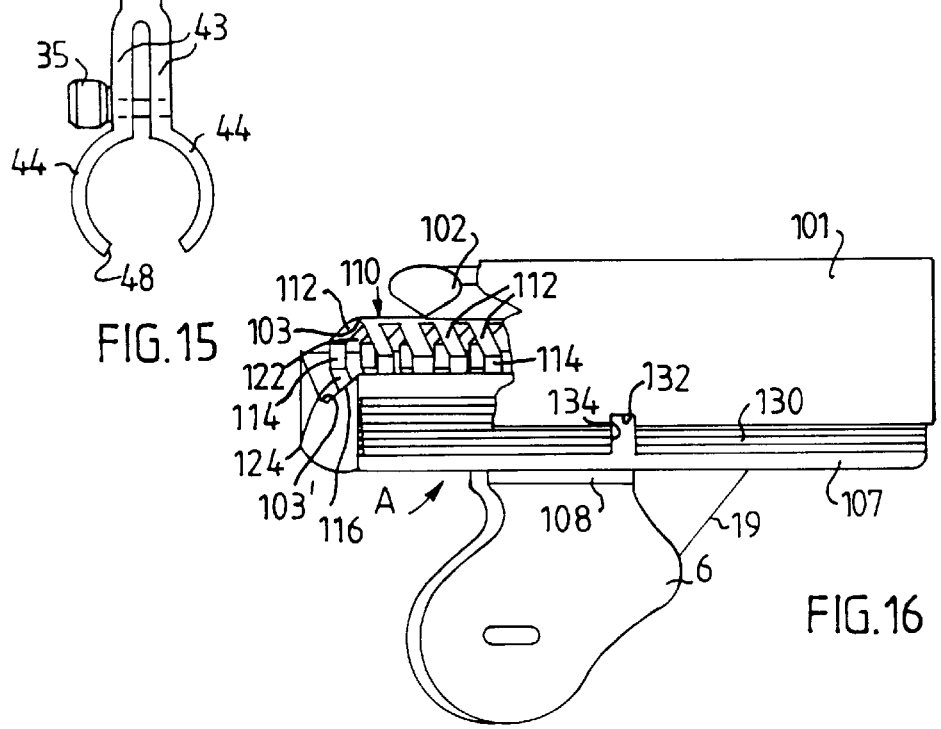

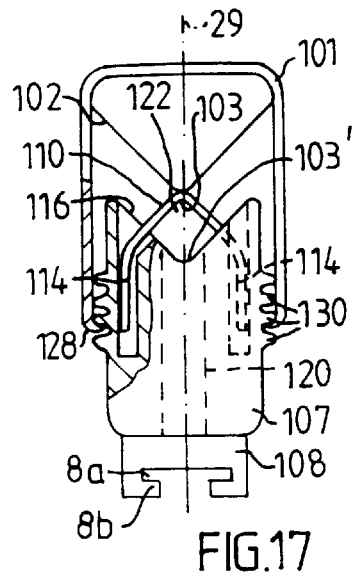
FIG.17
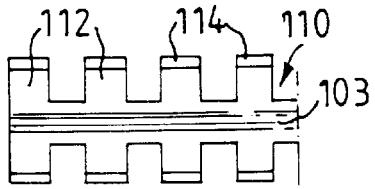
FIG.18
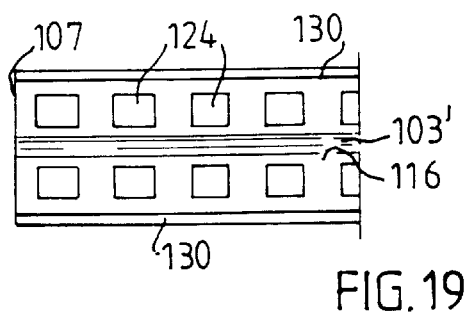
FIG.19
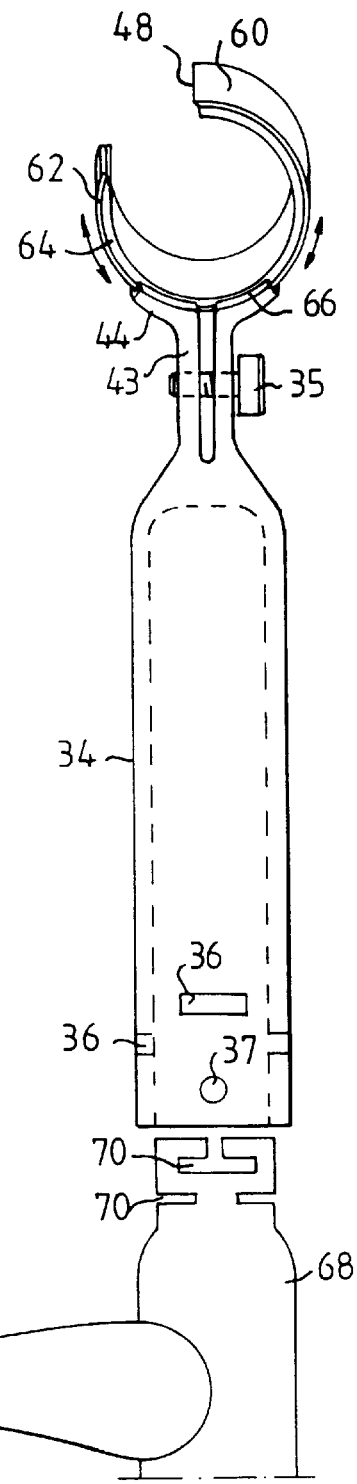
FIG.20

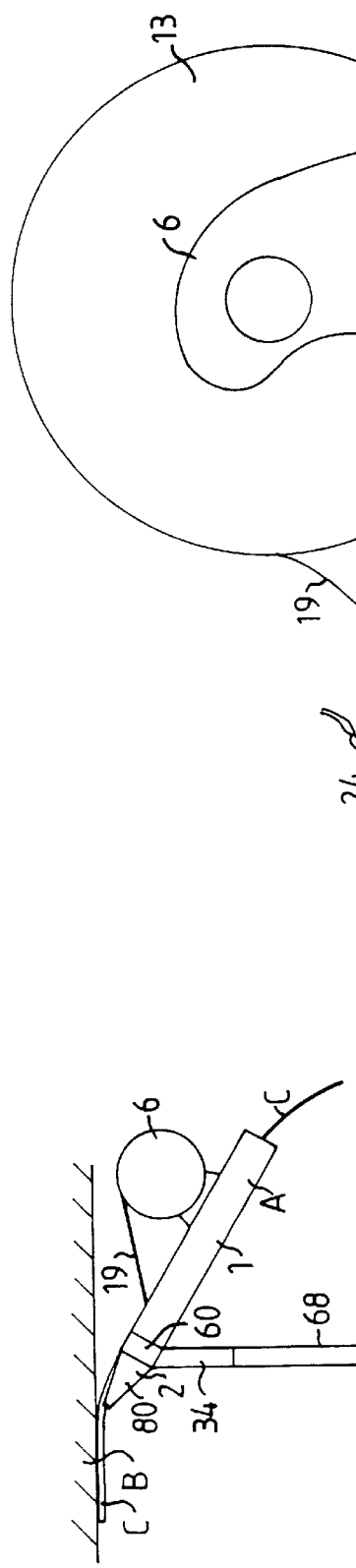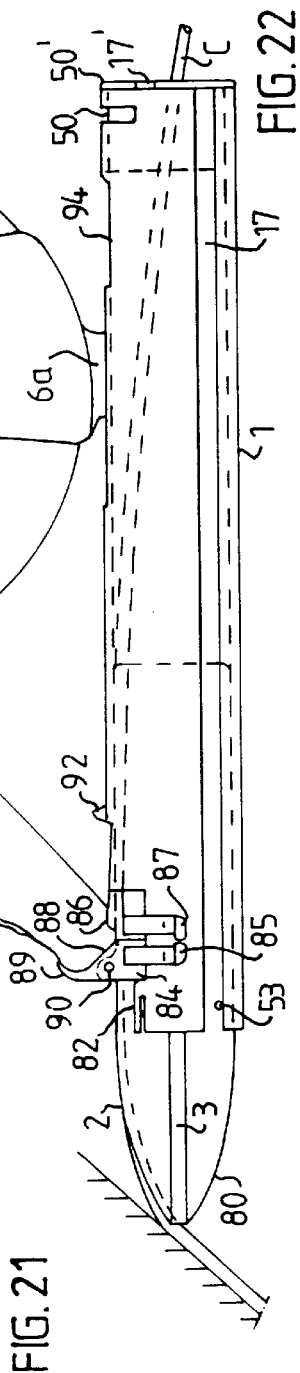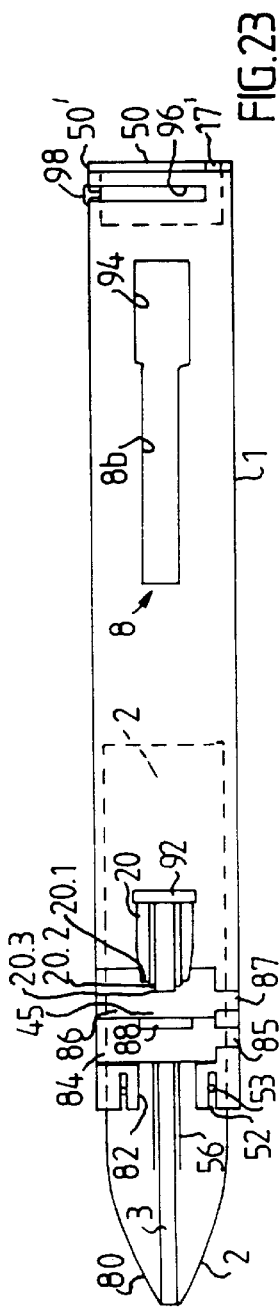

METHOD AND MEANS FOR AFFIXING A DOUBLE SIDED ADHESIVE TAPE ONTO AN ELECTRIC CONDUIT AND USE THEREOF

The present invention relates to a method for affixing a double sided adhesive tape onto an electrical conduit or other conduit for the purpose of attaching the conduit to a surface as defined in the preamble of claim 1. The invention also relates to a means for the execution of the method as defined in more detail in the preamble of the first device claim. In addition the invention relates to a tape holder or dispenser for a double sided adhesive tape intended to be used together with said device. Finally the invention relates to a use of the method and the device for the attachment of a conduit to a surface.

It is known to attach an adhesive layer and a protective paper onto conduits already during the manufacture of the conduits. When used the protective paper is removed and the conduit is pasted on. However, this results in unnecessary additional costs and adhesion problems at those times when an adhesive attachment is not wanted, for instance when the conduit is drawn through a pipe.

DE 827 372 discloses a procedure using a storage drum with a glue-covered electrical conduit together with a pressure roll exhibiting a handle. When using the device the conduit is rolled off against the surface below and is immediately attached to it by pressing with the pressure roll. Furthermore, the international patent application WO 9520834 describes a handle with a roller for pressure attachment of a conduit coated with glue or tape on a surface or pressure attachment of a conduit onto a surface covered with glue. However, none of these devices can be used for the affixing of an on two sides adhesive tape onto the conduit directly in connection with the mounting of the conduit.

DE 33 39 143 has earlier proposed a device for the affixing of an on two sides adhesive tape onto a conduit. Then the conduit is attached to a surface which first has been provided with a coating of contact glue. It comprises a back-pack device for a "flat band conduit" with a cable drum and a roll holder for an on two sides adhesive tape. They are simultaneously fed out between two rolls, one of these being driven by a motor.

This device has the drawback that it is unnecessary heavy because the entire cable roll must be carried on the back. Furthermore, it is not possible to discontinue the tape affixment for instance when passing through a wall or fitting the conduit in a pipe. Neither it is possible to switch the device between different conduits, for instance between different dimensions or between different conduits when several conduits are installed at the same time, without having several devices which results in increased costs.

Accordingly, the object of the present invention is to set aside the drawbacks of the Prior Art with a method which makes it possible to affix a double sided adhesive tape also on the middle of a conduit, which is easily switched between different conduits, which does not require any heavy lifting and which is easy to perform in various environments and narrow spaces. Furthermore, the object of the invention is to provide a device intended for the performance of the method which is easy to change-over between different conduit sizes and/or different tape widths, which has a low weight, which is simple and uncomplicated in construction as well as exhibits few moving parts and which has low manufacturing costs. A further object of the invention is to provide a device by which a conduit can directly be attached to a surface. Moreover, the object of the invention is to provide a tape holder, specially a disposable tape dispenser, intended to be used together with said device. A further object of the invention is to provide a use of the inventive method and device for the installation of specially electrical conduits.

These objects are achieved with the invention having the characteristic features set forth in the following claims.

A device for the performance of the inventive method comprises a body and a channel carrier exhibiting at least one channel intended for a conduit. Together with an opposite or facing side this channel is forming a through passage for said conduit, the channel carrier being removable and/or turnable for the purpose of releasing and receiving, respectively, said conduit. The facing side exhibits an inlet opening for a double sided adhesive tape. The facing side or an elevation therein or in the channel constitutes a press implement for fixedly pressing of the tape onto the conduit.

One or several channel carriers belongs to the device, each of them containing one or more channels suited for commonly occurring conduit dimensions. In certain cases it can be an advantage that the housing and the channel carrier does not have round surface profiles, one variant is that the surface profile consists of a symmetrical, equilateral unit or of a unit which is mounted in a slot on the base portion of the body. In this case no housing is needed.

At another embodiment of the invention the device is designed with a channel consisting of a top part and a bottom part which are interlocking with each other. In this way the surface profile of the channel can be varied depending on the requirements of the user by pressing the parts more or less far against each other, and locking them in the chosen position. By lifting off the top part of the device the conduit is uncovered when this is required for insertion and removal.

The inventive device is used in the following way: Before the mounting of the conduit is started a holder with a double sided adhesive tape is mounted on the body of the device. After that the operator chooses a channel in a channel carrier appropriate for the application and installs it in the permanent housing of the device unless this is already done. The channel is tried out for size by inserting a piece of the conduit in question in the various channels of the channel carrier. The channel carrier is inserted in the housing with the chosen channel proximate to the part of the housing close to the base portion of the body. The chosen channel and its facing side in the housing forms a through passage for the conduit.

At a device in which the housing and the channel carrier have round characteristics the channel carrier can be turned around, for instance with the aid of a channel selector pin. The channel carrier is fixed in right position with the aid of guide pins on the channel carrier and recesses on the outlet end of the housing and is locked by means of a stop. Then the end of the tape is inserted through a slot opening in the housing of the device. The conduit in question is inserted in the chosen channel which can be easily done even if the channel carrier is shorter than the housing. The housing has a release opening and through this the conduit can be inserted in the channel and be turned forward to working position.

When using non-round channel carriers and variable channel carriers the conduit is first put in position in the housing and then the channel carrier is put in position with the chosen channel in working position or with the wanted depth adjustment thereof.

The channel straightens up the conduit before it reaches the tape and provides a guiding of the conduit surface which shall be covered with tape. The tape is located centrally in a tape holder and is guided towards said conduit with the aid of the walls of the tape holder and slot opening in the housing of the device. The tape is pasted onto the conduit immediately after the passage through the slot opening of the housing and the pasting is strengthened when the taped conduit continues through the outlet end of the channel because the conduit and the tape passes a contraction. The slot opening is positioned close to the outlet end of the device such that the pasting occurs just before the taped conduit leaves the device. If the tape is attached at the inlet end of the channel the operator has no control of any twisting of the tape that may occur in the channel. Moreover, it is important that the conduit enters the device in a favourable way such that the twisting is as small as possible.

As the conduit is introduced in the channel of the device the tape is applied to that surface of the conduit which is intended for mounting. The mounting can be done by pressing the conduit against the intended substructure by hand as the conduit with its double sided adhesive tape leaves the device.

By pressing a tool, for instance the roller described in WO 9520834, against the conduit the pressure against the tape is increased at the same time as the contact surface is increased. In this way the adhesive bond will be stronger and the mounting of the conduit neater.

According to a specially favourable embodiment of the invention the device can comprise or be provided with means for the pressing of the conduit against a substructure directly when leaving the device. Such means may be a mouth piece or a roller mounted on the device. In particular the channel carrier of the device may exhibit a conical extension which works as pressing means.

It is easy to remove the protective paper from the tape since the tape and the protective paper or tape has been bent during the feeding through the slot and when it was pressed against the conduit. According to a favourable embodiment of the invention the protective paper is gradually removed with the aid of a paper removal means arranged on the device immediately before the conduit is pressed fixedly onto the intended place.

When a conduit in a building is passed through a ceiling, a floor, a wall and the like the device must be disengaged from the conduit since the conduit will continue in another room. This can favourably be accomplished with the invention, either by extracting the channel carrier from its housing such that the conduit is released from the open channel through the release opening of the housing, or by liberating the conduit by turning the channel of the channel carrier to a position facing the release opening and bring the conduit out through it. The width of the release opening must be at least as big as greatest width of the channel, i.e. the cross section of the greatest conduit. Furthermore, the conduit can favourably be introduced again in the device through said release opening, when the wiring job continues in another room. If the conduit is connected to an apparatus, a box or the like before the conduit is attached to the substructure the conduit can also in this case be be introduced in the device through the release opening.

The tape holder of the device may be stationary or separately connectable to the device. A separately connectable tape holder exhibits a foot in the shape of a connecting part intended to fit in an attachment means on the device. In the latter case it is easy to change to a different tape width by changing to another tape holder, for instance a disposable dispenser, which contains the wanted tape width. Furthermore, it should be possible to mount the tape holder at an inlet with the right slot opening with the right approach angle and lock it with a bolt or the like.

The tape holder may also be independent from the device, for example if you temporarily want to change over to use another tape width on a conduit with another dimension, or when the device is stationarily mounted on a workbench.

In the exit end of the device an exit mouthpiece may be connected in order to facilitate the wiring work. The mouthpiece exhibits a pressing on means with the aid of which a conduit can be attached to a substructure. The exit mouthpiece is open in the direction of the tape side of the conduit and towards the release opening of the housing. Instead of a mouthpiece a roller with a shaft may be attached to the device for pressing the conduit onto a substructure. The exit end of the channel carrier may also have the shape of a pressing on means.

In order to get a more steady hold a handle may be attached to the device. The handle has openings for receiving a mounting means so the device can be mounted on a table, a bench, a ladder or the like. Furthermore, the handle may be extended so that it is possible to stand on the floor and mount a conduit in the ceiling.

The invention will now be described in more detail with reference to exemplifying, non-limiting embodiments thereof and also with reference to the accompanying, schematic drawings in which:

FIG. 1 is a first embodiment of the inventive tape applying device comprising a housing and a channel carrier with round cross-section and a tape holder;

FIG. 2 is a section through the housing of the device shown in FIG. 1;

FIG. 3 is a section through the channel carrier of the device shown in FIG. 1;

FIG. 4 is a frontal view of the base part of the tape holder shown in FIG. 1;

FIG. 5 is a side elevation view seen against the inside of the base part shown in FIG. 4;

FIG. 6 is a frontal view of the tape holder lid for the tape holder shown in FIG. 4;

FIG. 7 is a side elevation view of the outside of the lid shown in FIG. 6;

FIG. 8 is a partially sectioned view of the tape holder foot and its fastening on the housing shown in FIG. 1;

FIG. 10 is a cross-sectional view being taken on the line X—X in FIG. 9;

FIG. 13 is a tape applying device comprising a pressure roller;

FIG. 14 is a detail view of a ring-shaped rear part of the tape applying device shown in FIG. 13;

FIG. 15 is a handle intended for the tape applying device;

FIG. 16 is a third embodiment of the tape applying device with adjustable channel size;

FIG. 17 is an end view of the device shown in FIG. 16;

FIG. 18 is a view of the top part of the channel shown in FIG. 16 seen from below;

FIG. 19 is a view of the bottom part of the channel shown in FIG. 16 seen from above;

FIG. 20 is an alternative embodiment of a handle with a shaft connection;

FIG. 21 is a schematic view showing an electrical conduit being attached to a ceiling surface with the aid of the invention;

FIG. 22 is a side elevation view of a fourth embodiment of the invention in which the channel carrier is shaped as a pressing means;

FIG. 23 is a view of the device in FIG. 22 seen from the side of the tape holder, the tape holder being removed;

Figure 9:
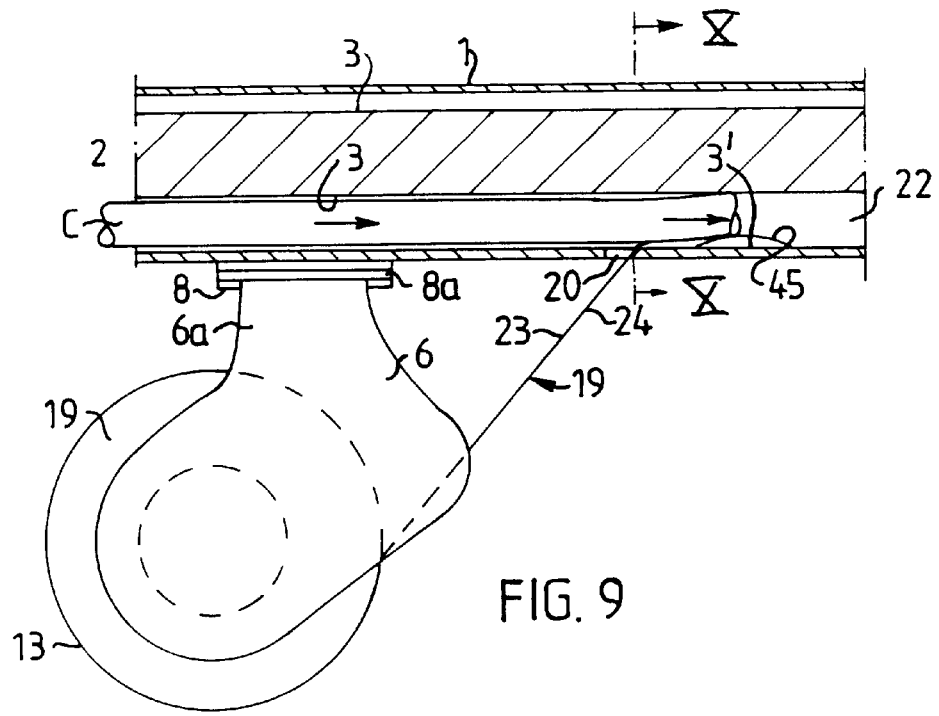
FIG. 9 is a principal view showing how a tape is attached to a conduit with the aid of the inventive device.

A first embodiment of the inventive tape applying device is shown in the FIGS. 1–10. FIG. 1 is an exploded view of the device which consists of a body A comprising a round housing 1 and a base portion 7 carrying a tape holder 6 as well as a channel carrier 2 with channels 3 matching the housing. The channel carrier 2 is turnable and can be turned around, for instance with the aid of a channel selector pin 33, in order to get the wanted channel in working position. The channel carrier is arrested there with a stop 5 which is arranged in a hole 4 in the wall of the housing 1. The stop 5 engages a hole 26 in the channel carrier 2 and arrests it, such that the chosen channel is fixed in its working position. In this respect applies that the angle v between imaginary planes 27 from the axis of the channel carrier to the centre line of each channel and planes 42 through each hole 26 shall be the same as the angle v between the longitudinal symmetry plane 29 of the device and an imaginary plane through the axis 28 of the housing and the stop hole 4.

In order to get a round channel carrier 2 in right position in the housing 1 in a simple way, the housing can be provided with in relation to the working positions of the channels symmetrically positioned recesses 52 and the channel carrier be provided with a corresponding protrusion 53 which is intended to engage one of the recesses 52 for an initial locating before locking with the stop 5. The stop 5 can be a simple bolt, but it can also be a spring loaded ball or a spring loaded pin. Such elements are well known in the Art for similar applications and are therefore not described in detail. As alternative to the recesses 52 and the protrusions 53 the channel carrier may comprise longitudinal grooves 54 through the holes 26 as shown with dashed lines in FIG. 1.

The base portion 7 substantially consists of an attachment means 8 for the tape holder 6 and connecting parts towards the housing 1 extending from the attachment means. The tape holder attachment means consists of longitudinal grooves 8a and surrounding flanges 8b intended to enclose fastening flanges 9 on the foot 6a of the tape holder.

The FIGS. 4–7 illustrates a preferred tape holder for repeated use. It consists of a wall 11 connected to the fastening flanges 9 of the holder. The wall 11 constitutes a base for a tape carrying means or spool 21 for a tape roll 13, said means at the same time being an attachment for a removable wall or tape holder lid 10. The lid 10 exhibits semi-circular locking means 12 separated by slit openings 14. The locking means are squeezed together when they are inserted in the tape carrying means 21 of the holder. In this way a certain retaining resistance will occur such that the lid will be kept in position. The lid is brought to correct position by causing its edge 15 to bear against a shoulder 16 on the foot of the tape holder. The outer portion of the lids edge 15 will then together with the opposite fastening flange 9 form a groove 9a which surrounds the flange 8b. In the same way the edge of the wall 11 and the flange 9 form a groove 9a.

The wall 10 exhibit a handle or knob 18 with the aid of which the lid easily can be removed for the exchange of the tape roll 13.

That channel 3 on the channel carrier 2 which is in working position defines together with an opposite or facing wall 3' on the inside of the housing 1 a through passage 22 for an electrical conduit or an other elongated object C. Close to the outlet end of the device there is arranged an opening 20 or several openings 20.1, 20.2 of different size in the opposite side 3'. Through such an opening a double sided adhesive tape 19 is intended to be inserted with its exposed glue-covered side 23 facing the conduit C. During passage through the channel the tape is pasted in centred position onto the conduit C. On the opposite side of the tape the glue surface is covered by a protective paper 24 which prevents the tape from sticking to the opposite side 3'. By chosing an inlet opening 20 with marginally greater width than the tape it will get support from the sides of the opening, and you avoid that it is attached askew on the conduit and possibly sticks to the wall of the channel 3. As an additional protection against that the tape should get stuck in the channel the outer part thereof exhibits a recess or step 56 in outward direction as shown in FIG. 10.

In order to give the tape an appropriate entering angle into the opening 20, the tape holder is slidably arranged in the tape holder attachment means 8 in the longitudinal direction of the device. In this way it is possible to compensate for which of the inlet openings 20.1, 20.2 is chosen and for how much tape is left on the roll 13. In order to lock the tape holder in wanted position the tape holder attachment means 8 exhibit a locking means 38 consisting of a bolt or the like which abuts the fastening flange 9 of the tape holder. So as to get a more secure locking of the position the flange 9 may exhibit recesses 57 defining the position.

The opposite side 3' constitutes an abutment and forces the tape 19 against the conduit C. Advantageously the side 3' may exhibit an elevation 45 which provides a constriction of the through passage 22. In this way a good fastening by pressure of the tape against the conduit is achieved, but the conduit does not need to be squeezed and slowed down for the entire length of the passage. The elevation 45 can for instance be a plain elevation in the opposite side 3', a biased plate spring or a spring loaded ball.

To be able to release the tape applying device from the conduit then this is necessary because of the layout of the installation, the conduit is removable through a longitudinal release opening 17 in the housing 1. The conduit can be released by removing the channel carrier 2 from the housing such that the release opening 17 is exposed. A round channel carrier can also be turned in the housing 1 such that the channel 3 containing the conduit will be situated straight opposite the opening 17.

Conversely, a conduit C can be inserted in the device through the release opening 17 when the channel is pulled out. A round channel carrier can also be located with the appropriate channel 3 facing the release opening. Then the channel carrier is turned around so that the engaged channel gets in working position for the applying of the double sided adhesive tape 19.

Before the removal of the conduit from the tape applying device the tape must first be cut off between the tape roll 13 and the slot opening 20. If possible, the cut off point is chosen so that the desired length of the conduit will be tape covered. In the same way it applies, when starting a tape applying operation, that the conduit is brought forward in the passage until its desired tape cover starting point arrives to the opening 20, then the tape 19 is introduced through the opening and brought up against and attached to the conduit.

Figure 12:
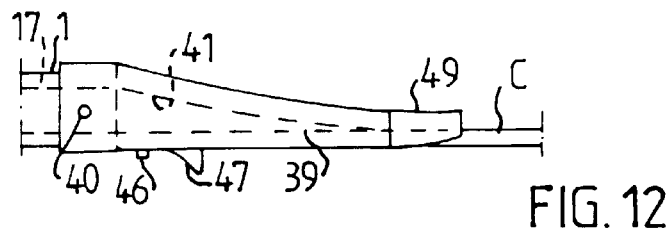
FIG. 12 is a side elevation view of an exit mouth piece for the inventive tape applying device.
Figure 24:
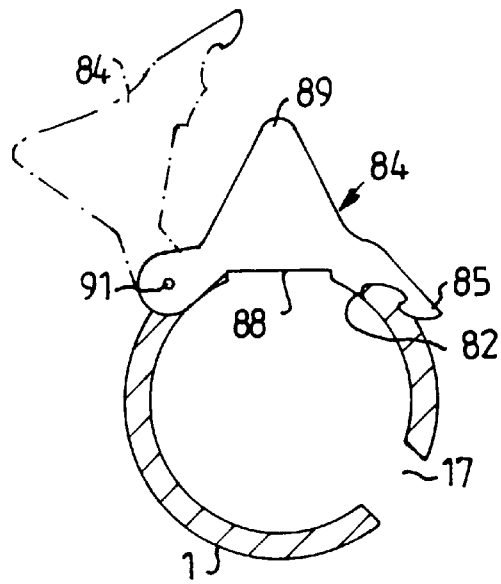
FIG. 24 is a detail section of FIG. 22 with a paper removal means in open and closed position.
Figure 26:
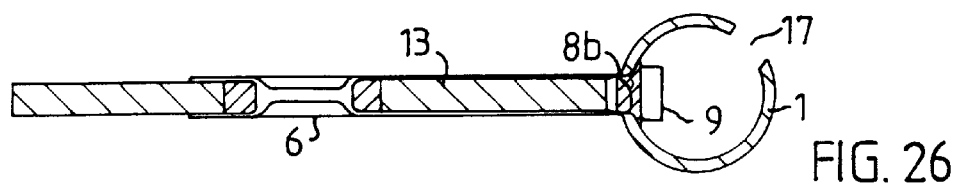
FIG. 25 is a perspective view of the device in FIG. 22 being used for cable mounting and FIG. 26 is a cross sectional view through the device in FIG. 22 through its tape holder.
Figure 25:
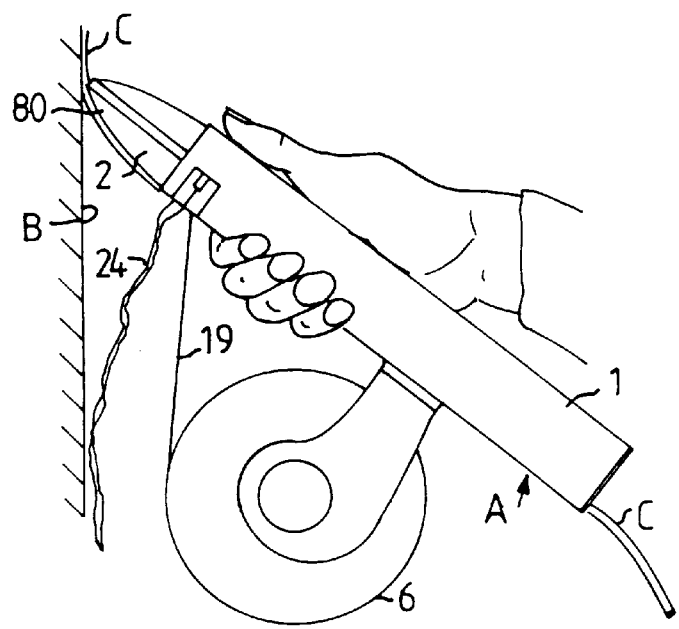

FIG. 12 illustrates an exit mouthpiece 39 which is connected to the exit end of the housing 1 with the aid of a locking screw 40. The mouthpiece 39 can be used for the guiding of a conduit C at its mounting on a substructure B. Advantageously, the mouthpiece 39 can exhibit an overlaying pressing on means 49 at its exit end. In order to permit the removal of the conduits out of the mouthpiece 39 it exhibits an open side 41 which is connected to the release opening 17. With the aid of the pressing on means you can directly when feeding out the conduit press it on in the desired position and thus the mounting is done by means of the tape applying device. Close to coupling boxes and places with difficult accessibility you still have to mount the conduit by hand or with the aid of a separate pressing on means.

In order to remove the protective paper 24 from the tape covered conduit already when the tape is affixed, a paper remover in the shape of a wire or a band 46 can be arranged at the conduit outlet from the tape applying device, for instance in the beginning of the exit mouthpiece 39. In order to get an extra fast mounting with the aid of the mouthpiece 39 this can be provided with a deflector underneath, for instance a bent plate or the like 47 which moves the protective paper side-ways as it is liberated from the tape pasted to the conduit.

FIG. 13 illustrates a tape applying device which is provided with a conduit pressing on means in the shape of a roller wheel 32 which through a shaft 31 is mounted directly on the inventive tape applying device. In a first embodiment the shaft is arranged in a central hole 28' in the channel carrier. In order to assume a stable operating position and prevent pivoting of the roller wheel, its connecting arm 31 is provided with a pin 31*a*. This is entered in a slot in the outlet end of the channel carrier. To prevent the roller from disengagement it is fastened by means of a locking ring 55 at the inlet end of the channel carrier. According to an alternative embodiment shown in dashed lines the roller arm 31 can be mounted in a connecting attachment 51 on the outside of the housing 1. The connecting attachment is of the same type as the tape holder attachment means 8.

At the device in FIG. 13 the channel carrier is designed shorter than the housing 1 in order to diminish the weight. To make sure that the conduit C shall not slip into the release slot 17 and get stuck, there is arranged an inlet ring 50 in the rear end of the housing. The ring 50 exhibits an opening 17' shown in FIG. 14 corresponding to the release slot 17 and is turnable between a releasing and a closed position.

A handle 34 shown in FIG. 15 can be mounted on the device as support when the inventive device is used for a direct mounting of a conduit onto a substructure. The handle exhibits two shanks 43 which on their ends carries clamps 44 with the same shape as the housing 1 and intended to surround it. The shanks are squeezed together with a screw 35. The free ends of the clamps exhibit an opening 48 which is at least as big as the release opening 17. In the other end of the handle there are holes 36 in which a clamp can be fitted to clamp the device onto a table. This can be used if you wish to cover a substantial length of cable with a double sided adhesive tape in order to attach it to a substructure later on.

FIG. 20 illustrates an alternative embodiment of a handle 34 which connects to a ring 60 arranged on the housing 1 which ring is open at the release opening 17. The ring exhibits fastening flanges 62 and beneath them recesses 64 which are surrounded by gripping flanges 66 on the clamps 44 of the handle. During mounting the clamps 44 are introduced in the opening 48 of the ring and are then traversed on the fastening flanges 62 to the desired position and are secured with the screw 35. In its other end the hollow handle 34 exhibits holes 36 and a coupling pin 37 with the aid of which an extension rod 68 with coupling notches 70 can be connected to the handle. The rod 68 may exhibit one or more transverse handles 72. The rod 68 makes it possible to stand on the floor and attach a conduit to the ceiling or high up on a wall without any aid of a ladder except at coupling boxes and other connection points as schematically shown in FIG. 21.

Figure 11:
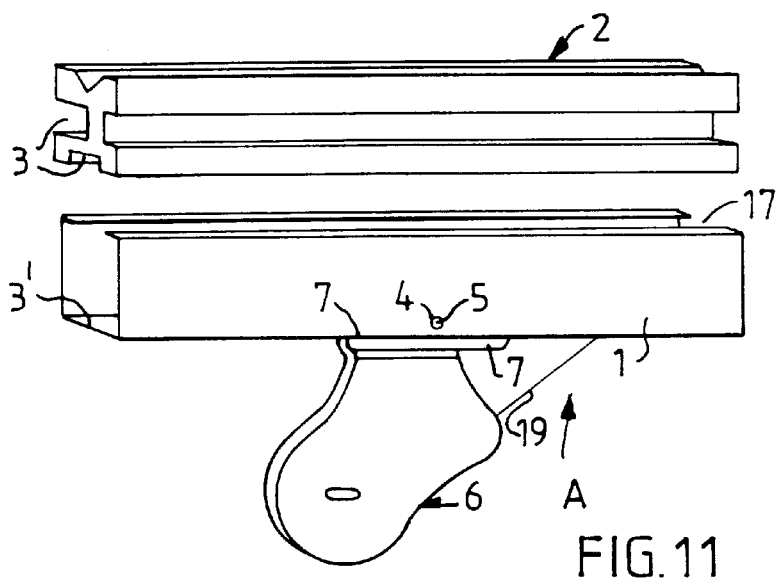
FIG. 11 is a second embodiment of the invention in which the housing and the channel carrier exhibit a square cross-section.

FIG. 11 illustrates a side elevation view of an embodiment with symmetrical, equilateral cross section, in this case a device with a square housing 1 and a channel carrier 2 matching the housing. The channel carrier can be mounted by introducing it into the housing 1 in various selected positions such that the desired channel 3 will be turned against a facing side 3' in the lower part of the housing, thus forming a through passage 22. Into this the conduit will be fed and be applied with an on two sides adhesive tape through an opening in the facing side 3'. In other respects this embodiment coincides with the first described embodiment.

FIGS. 16–19 illustrates an alternative embodiment of the invention with variable channel size. It consists of a body or bottom part A and a top part comprising a cover 101 with a channel carrier 102. The body A consist of a bottom portion 107 and on its underside there is arranged a tape holder attachment means 108 corresponding to the tape holder attachment means 8 described above. The channel carrier 102 carries an angle shaped plate 110 which has a central portion bent in an obtuse angle to form a channel 103. The flanks of the plate is divided into tongues 112. The outer parts 114 of the tongues are bent downwards parallel to the centre plane 29 of the device. The plate 110 is secured to the channel carrier 102 by soldering, glueing or in some other way depending upon what materials the plate and the channel carrier are made of. It can also be made in one piece with the channel carrier in which case the tongues 112 are offset and interlocking with each other. The plate 110 can be made of sheet metal, plastic or some other material.

The bottom portion 107 consists of a massive body which on its top side exhibits a V-shaped notch 116 with rounded bottom which is situated opposite the channel 103 and forms a facing surface 103'. Together they surround a through passage 122. An inclined passage 120 extends through the bottom portion 107. A double sided adhesive tape 19 can be passed through this passage to the through channel 122 in order to be pressed against and affixed to an electrical conduit C which is passing therethrough. In the flanks of the V-shaped notch there are arranged holes or wells 124 in which the outer parts 114 of the tongues are lowered.

This tape applying device can be adapted for an arbitrary conduit thickness by moving the channel carrier 102 vertically. In order to retain the channel carrier at the desired height level the sides of the cover 101 exhibits inwards directed flanges 128 at the bottom which engages rifles 130 on the sides of the bottom portion. For a more fine adjustment the flanges can be introduced in rifles at different levels on each side. The cover is easily disengaged for height adjustment with the aid of screw driver tracks 132, 134 in the flanges 128 and the rifles 130, respectively.

FIGS. 21–26 illustrates a further embodiment of the inventive tape applying device in which the channel carrier 2 is designed with a point 80. With the aid of this point a tape covered conduit can be directly attached to a substructure. In this case the tape inlet 20 is continuing forwardly as an open slot 82. Over this slot a paper remover 84 and a tape pressing means 86 are arranged on a hinge 91 so they can be lifted up. They are kept in closed position by hooks 85 and 87, respectively, which engages in corresponding recesses on the housing 1.

The paper remover exhibits an edge 88 which with a relief extends down towards the tape web. The protective paper is then deflected by a point 89. In order to prevent the tape from sticking to the paper remover a roller 90 made from non-adhering material be arranged on in the paper remover straight across the tape web.

The tape pressing means 86 exhibits a press pad 45 which forces the tape down against a conduit C when passing. Its inlet side is stepped with ledges 20.1, 20.2 and 20.3 to suit different tape widths in order to guide tapes of different width centred against the conduit. In this case the pressing means can not be resilient, any possible springy press means must be arranged in the channel 3. Alternatively, the channel 3 may be designed with a constriction. Advantageously, a finger stop 92 is arranged in front of the tape inlet 20 to prevent the hand from gliding forward towards the tape during mounting of conduits.

The tape holding means is in this case designed as a slot 8 in the wall of housing 1 itself. The edges of the slot constitutes the fastening flanges 8b. In the rear part of the slot there is an enlargement 94 constituting an inlet for the foot 6a of the tape holder. The tape holder can be positioned differently far up in the slot, possibly with the aid of protrusions and recesses in the tape holder foot and the flanges 8b, respectively, in order to get a suitable entering angle for the tape 19. Expediently, the tape holder could be of simple disposable dispenser type with a foot 6a, 9 which is specially adapted to fit the tape holder seat 8.

FIGS. 22 and 23 illustrates how the retaining ring 50 is arranged in the rear portion of the housing. The ring exhibits a flange 50' which abuts the rear end of the housing 1. The ring also exhibits a retaining screw or a guide pin 96 which is running in a track 98 which is limiting the rotation. The ring is seized in the guide pin 96 or the flange 50' and is brought between a closed position and an open position where the slot 17' of the ring lines up with the slot 17 in the housing.

It will be understood that the invention is not restricted to the illustrated and described exemplifying embodiments thereof, and that variations and modifications can be made within the scope of the inventive concept as defined in the following claims. For instance, the channels may be designed with a track for two parallel conduits. The device may also have several exchangeable channel carriers with different channel sizes or with one single channel in which case the channel carrier is not turned around.

A round channel carrier may either be easily extractable or more permanently mounted, so that it is only removed for service and repair. A housing for the embodiment according to the FIGS. 16–19 may be mounted on a hinge on one side and be closed more or less far, in order to achieve through passages 22 of different size, instead of being removable in its entirety.

Furthermore, the base unit A may be fitted with an attachment means corresponding to the attachment means 8 and its grooves 8a to receive a channel carrier similar to the one in FIG. 11 which is mounted with flanges engaging in the grooves instead of in a square housing 1. By providing such a channel carrier 2 with a V-shaped channel 3 and several parallel flanges, it is possible to use the same channel carrier for many different conduit sizes in the same way as the in the embodiment of FIGS. 16–19.

Furthermore, the tape holder 6 may be made in one piece with the base portion 7 only the lid 10 being removable. In addition the lid may even be completely excluded and the tape roll 13 be mounted on the spool 21.

I claim:

1. A method for affixing an adhesive tape to an electrical conduit that is intended to be attached to a surface, the adhesive tape having an adhesive on two sides, the method comprising the steps of:

introducing the electrical conduit into a passage formed by a channel defined in a channel carrier and an opposite side of an elongate body, the body supporting the channel carrier;

introducing the adhesive tape into an opening defined in the channel carrier; and fixedly applying the adhesive tape onto the electrical conduit by the opposite side of the body.

2. A method according to claim 1 wherein the step of fixedly applying comprises the step of urging an abutment disposed on the opposite side of the body against the adhesive tape.

3. A method according to claim 1 wherein the method further comprises the steps of introducing the electrical conduit into and removing the electrical conduit from the passage and removing the channel carrier from the body.

4. A method according to claim 3 wherein the method further comprises the steps of turning around the channel carrier and aligning the channel with an opening defined in the body.

5. A method according to claim 1 wherein the method further comprises the steps of fixedly pressing the electrical conduit to the surface and removing a protective paper from the electrical tape.

6. A device for affixing an adhesive tape onto an electrical conduit, comprising:

an elongate body having a side;

a channel carrier disposed in the body;

a channel defined by the body and the channel carrier;

the electrical conduit being removably and rotatably disposed inside the channel;

an inlet opening defined in the side of the body; and the adhesive tape having an adhesive on two opposite sides, the adhesive tape being pressed against the electrical conduit by the side of the body to fixedly attach the adhesive tape to the electrical conduit.

7. A device according to claim 6 wherein the channel carrier is cylindrical and defines at least one groove and the body comprises a base portion defined therein, a release opening is defined in the body, the groove is movable into an operable position, so that the groove together with the side of the body form the channel, and a removal position so that the groove is radially aligned with the release opening.

8. A device according to claim 7 wherein the channel carrier is axially insertable into and removably out of the body and the channel carrier is mounted in the base portion.

9. A device according to claim 6 wherein the channel carrier defines a first channel portion including teeth that engage a second channel portion at the base portion.

10. A device according to claim 9 wherein the teeth form a rhombic passage extending through the channel carrier, the channel carrier is supported by a vertically movable housing.

11. A device according to claim 7 wherein the base portion has an attachment device for a tape holder.

12. A device according to claim 6 wherein the body has a pressing device to fixedly press the electrical conduit that is covered with the adhesive tape onto a surface.

13. A device according to claim 6 wherein the device further comprises a tape holder that is attachable to the body.

14. A device according to claim 13 wherein the tape holder holds a roll of the adhesive tape.

15. A device according to claim 14 wherein the tape holder comprises a base part and a removable lid to permit the roll of the adhesive tape to be removed from the tape holder.

* * * * *